Figure 4:
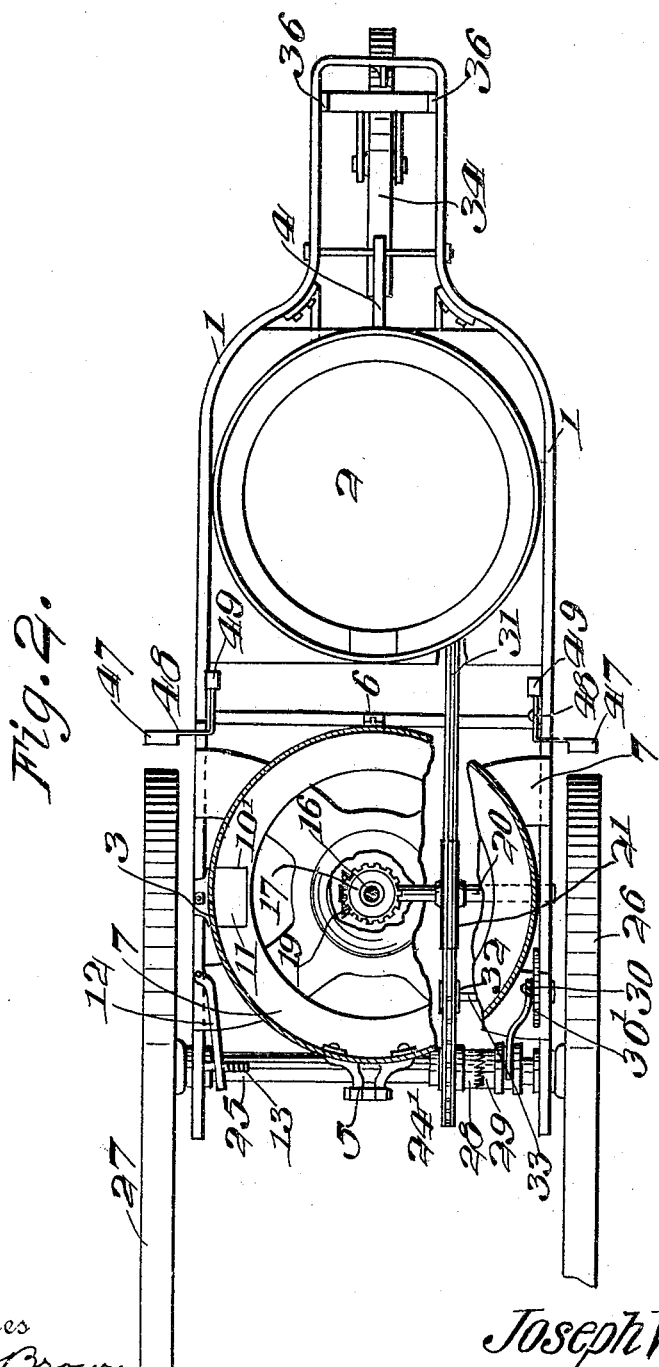

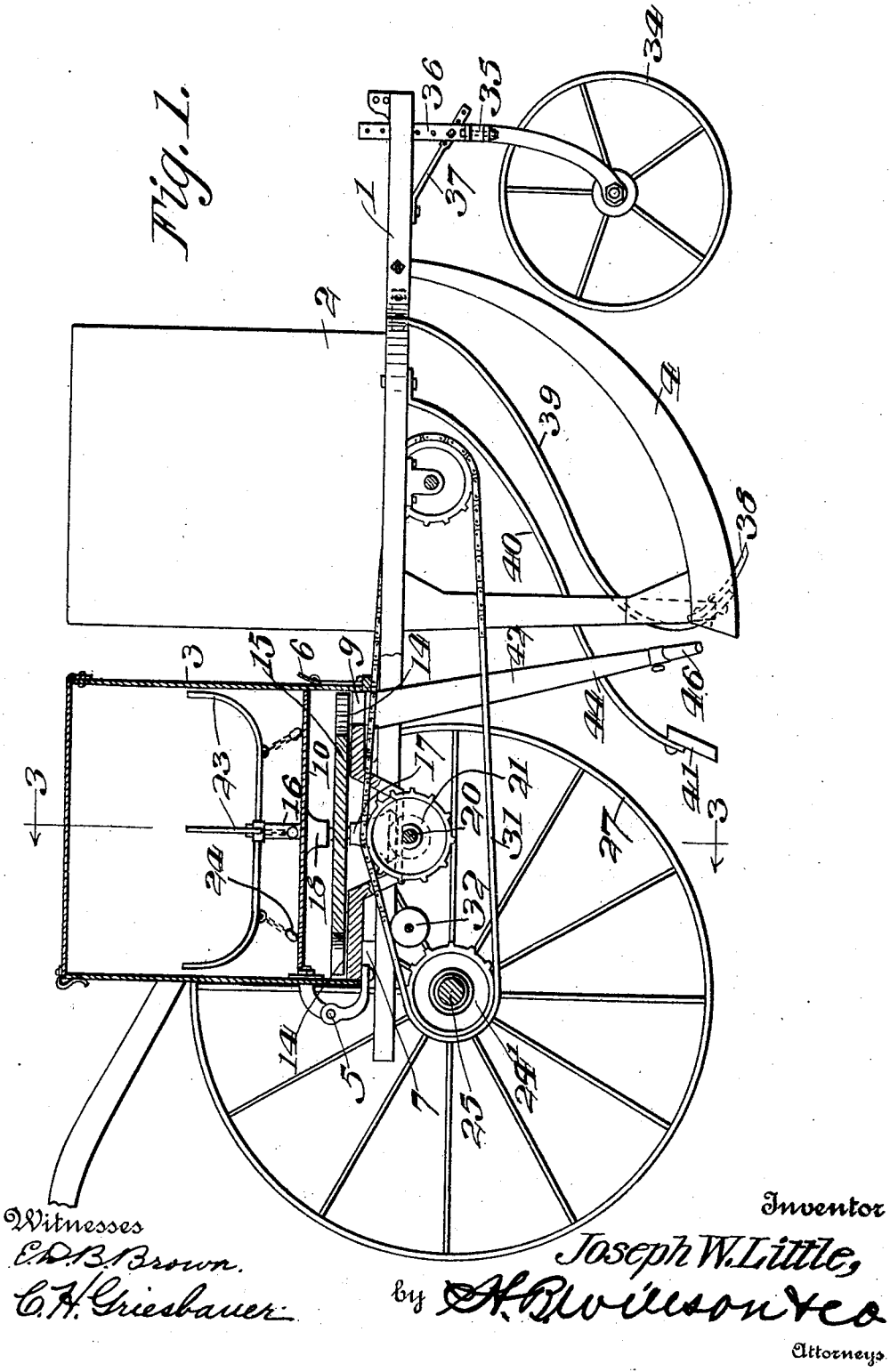

J. W. LITTLE.
FERTILIZER DISTRIBUTER.
APPLICATION FILED SEPT. 17, 1908.

932,301.

Patented Aug. 24, 1909.
4 SHEETS—SHEET 2.

Witnesses
E. D. B. Brown.
C. H. Griesbauer.

Inventor
Joseph W. Little,
by H. B. Willson & Co.
Attorneys

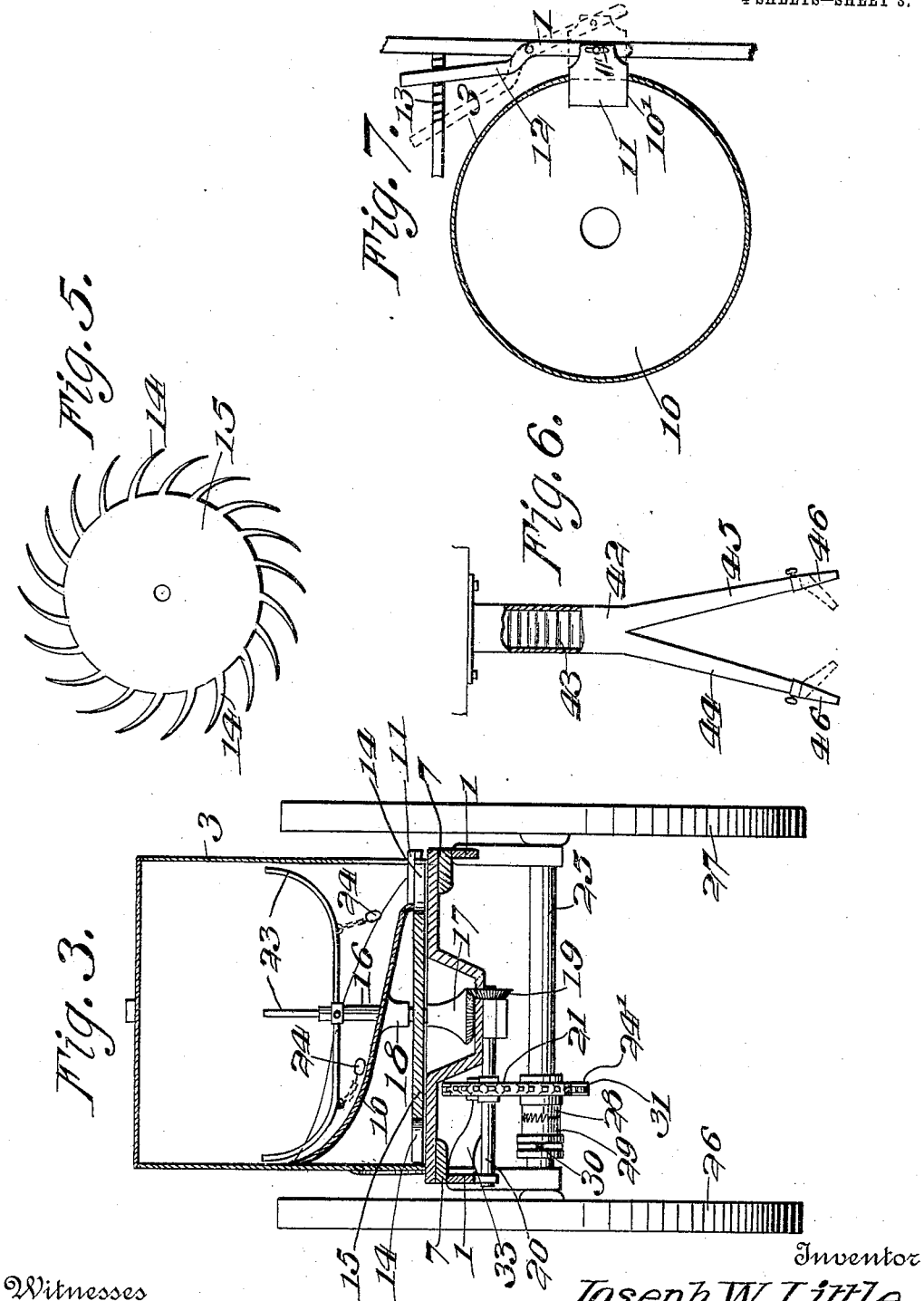

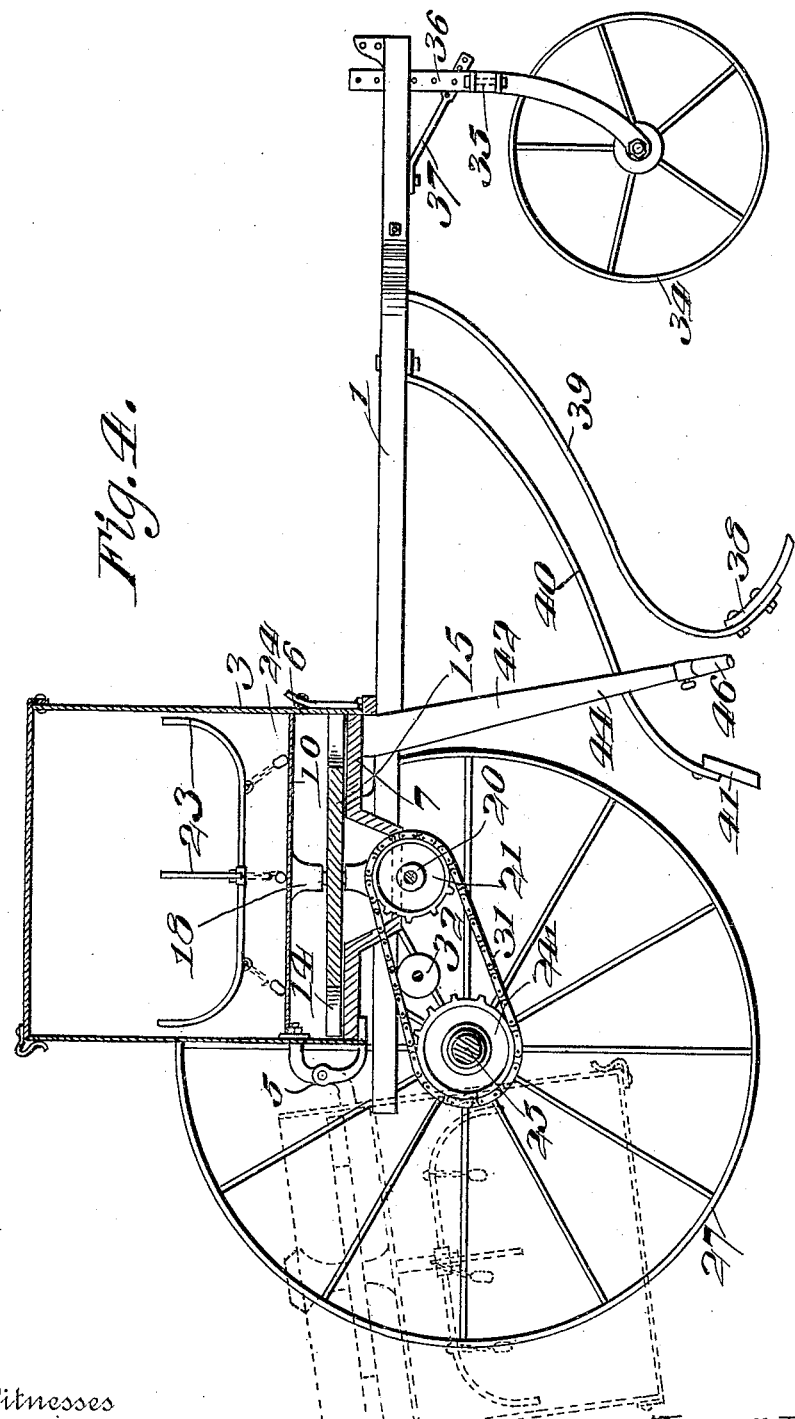

UNITED STATES PATENT OFFICE.

JOSEPH W. LITTLE, OF WEST POINT, MISSISSIPPI.

FERTILIZER-DISTRIBUTER.

932,301.  Specification of Letters Patent.  Patented Aug. 24, 1909.

Application filed September 17, 1908. Serial No. 453,534.

*To all whom it may concern:*

Be it known that I, JOSEPH W. LITTLE, a citizen of the United States, residing at West Point, in the county of Clay and State of Mississippi, have invented certain new and useful Improvements in Fertilizer-Distributers; and I do declare the following to be a full, clear, and exact description of the invention, such as will enable others skilled in the art to which it appertains to make and use the same.

This invention relates to an improved fertilizer distributer, and the object thereof is to provide a simply constructed and efficient apparatus of this character in which damp and wet fertilizer may be readily distributed, and which may be dumped when desired to prevent corroding of the various parts thereof.

Another object of the invention is to provide means for distributing the fertilizer in two or more rows, said means being adjustable to vary the space between the rows.

With these and other objects in view, the invention consists of certain novel features of construction, combination and arrangement of parts, as will be more fully described and particularly pointed out in the appended claim.

In the accompanying drawings, Figure 1 is a vertical longitudinal section of a distributer constructed in accordance with this invention, and used in connection with a seed planter, Fig. 2 is a horizontal longitudinal section thereof with parts broken out, Fig. 3 is a vertical cross sectional view through the hopper showing the feeding mechanism, Fig. 4 is a vertical longitudinal section of a distributer constructed for use without a planter, the hopper being shown upset, or thrown back in dotted lines, Fig. 5 is a detail plan view of one of the fertilizer feeding plates, Fig. 6 is a detail view showing the dropping or discharging spout in front elevation, Fig. 7 is a horizontal section through the hopper with the cut-off shown in closed position in full lines and in open position in dotted lines.

In the embodiment illustrated a supporting frame 1 is shown, on which is mounted a seed hopper 2, and a fertilizer hopper 3, the seed hopper being similar to that shown in my U. S. Patent No. 838,345, dated Dec. 11, 1906, and is provided with the ordinary furrow opener 4, arranged therebelow. The fertilizer containing hopper 3 is preferably mounted to be upset, being hingedly connected with the frame at 5, and having any suitable locking means as 6, for locking it in operative position. This hopper 3 is provided with a bottom 7 to support a feed disk or plate 15 and permit it to turn thereon, and on which fertilizer is carried in its passage to the opening 9 formed in said bottom 7.

A cover plate 10 is mounted over the feed wheel 15 and is arranged with one end thereof inclined preferably toward the left side and is provided with an opening 10' adapted to be closed by a cut-off valve 11 mounted on a lever 12. A rack 13 is mounted on the frame 1 with which the lever 12 is adapted to be engaged to lock it in adjusted position to hold the cut-off valve 11 in either open or closed position, or at any suitable point to vary the amount of fertilizer fed through the opening 10' in the plate 10. This inclination of plate 10 causes the fertilizer to flow toward the opening 10' and prevents it from adhering to the walls of the hopper when nearly empty. This plate 10 rests lightly on the feed wheel 15 and is secured to the hopper 3 to hold it in place when said hopper is tilted backward and has a bearing 18 through which the shaft 16 passes.

The fertilizer fed through the opening 10' is conveyed by blades 14 arranged tangentially on the plate or feed wheel 15 to the opening 9, and which are designed to prevent clogging of the fertilizer in the opening 9, should it become damp or wet. A vertically disposed shaft 16 extends into said hopper, and carries on its lower end the bevel gear 17, which meshes with a similar gear 19, mounted on a horizontally disposed shaft 20, through which motion is imparted to said shaft 16. A sprocket wheel 21 is also mounted on the shaft 20 and receives motion from a sprocket chain operated by means hereinafter described.

Agitators as 23 are secured to the shaft 16, and revolve therewith serving to agitate the fertilizer in the hopper and keep it moving toward the opening 10' at the left of the plate 10, shown clearly in Figs. 1 and 4. Any desired numbers of agitators may be mounted within the hopper on the shaft 16, four being shown. Mounted within the hopper 3 on the agitators are a plurality of weights or drags as 24, which are designed to assist in forcing the fertilizer through the opening 10', each of said drags being intended to pass over the opening and prevent clogging thereof should the fertilizer become wet or lumpy.

The lever 12 is preferably connected with the cut off 11 by means of an elongated eye or aperture 11' (see Fig. 7) which is designed to permit the valve or cut-off 11 to pull or draw straight from the lid or cover without binding on either side of the opening 10'.

A sprocket gear 24' is mounted on the axle 25, which connects the two ground wheels 26 and 27. This gear wheel 24' has a clutch member 28 and turns loosely on said shaft. A clutch member 29 is slidably mounted on the shaft 25, and is rotatable therewith, and is adapted to normally mesh with the clutch member carried by the gear wheel 24'. An operating lever 30 is mounted on the frame 1 in position to engage the clutch member 29, and is adapted to be engaged with a rack bar 30', for locking the clutch in either of its two extreme positions and connect or disconnect it from the gear wheel clutch member. A sprocket chain 31 passes over the gear 24' and the sprocket 21 mounted on the shaft 20, and on the turning of the axle caused by the movement of the machine over the ground motion is imparted to said shaft 20 for operating the shaft 16 and the parts connected therewith.

Any suitable means may be provided for regulating the tension of the sprocket chain 31, that shown in the form of a roller 32, mounted on an arm 33, which is adjustable by means of an ordinary set screw and slot, or in any other suitable manner for tightening or loosening the chain 31, as desired.

From the above description it will be readily seen that when it is desired to throw the distributing mechanism out of operation the lever 30 is shifted to disconnect the clutch 29 from the clutch member 28 of the gear wheel 24', which permits the shaft to turn within this wheel without imparting motion thereto.

It will be obvious that when the ground wheels 27 move forward over the ground the clutch member 29 being in engagement with the clutch 28 of the gear 24' motion is imparted through the sprocket chain to the shaft 20 which causes the bevel gear 19 to operate the gear 17, turning it from the left toward the right and imparting a similar motion to the disk or feed wheel 15 and the agitators 23. The gear also is designed to actuate the mechanism of the planter when used in connection therewith.

A wheel 34 is connected with the front end of the frame 1 by means of the swivel joint 35, which is connected with said frame 1 by means of two spaced bars as 36, having longitudinally spaced apertures for adjustably securing them to said frame whereby the frame may be raised or lowered as is desired. Braces 37 also connect the bars 36 with the frame 1, and these braces are preferably provided with take up eyes for keeping the bars 36 in upright position, as they would be likely otherwise to stand out or project forward at the bottom when attempts were made to change the depths of a shovel or furrow opener to be described. A shovel as 38 is mounted at the free end of standard 39 secured at its other end to the bottom of the frame 1, and arranged on spring bars 40, are scrapers or coverers 41, which follow the distributing or discharge spout of the fertilizer hopper now to be described. Secured to the lower face of the hopper below the opening 9 therein is a discharge spout 42, which is preferably provided on its inner face with transversely arranged corrugations 43, designed to assist in breaking up the clods of the fertilizer passing thereover, and prevent its clogging in the spout. This spout is preferably bifurcated at its lower end to form spaced members 44 and 45, adapted to extend on opposite sides of the row of seed planted, and each of which is provided with an adjustable nozzle as 46, preferably constructed in the shape of an elbow, as shown in Fig. 6 and held in position on the members 44 and 45 by means of set screws, or any other suitable means. To vary the distance between the discharge end of these nozzles they may be turned in either direction according to the space desired to be formed between them. By the use of this improved discharge spout the fertilizer may be distributed in two rows between which the seed is planted at any desired width apart and at any desired depth.

If desired the machine may be provided with scrapers 47 for removing earth from the ground wheels when planting in wet earth. These scrapers 47 are mounted on levers 48 having weights 49 at their other ends for holding the scrapers normally out of contact with the wheels.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

I claim as my invention:

In a fertilizer distributer, the combination of a supporting structure mounted on ground wheels, a feed hopper mounted on said structure and having a discharge opening in the bottom thereof, a vertically disposed revoluble shaft extending upwardly into said hopper, a feed wheel carried by said shaft revoluble therewith and disposed horizontally within said hopper and provided with blades or fingers extending tangentially therefrom, agitator arms carried by said shaft, an inclined false bottom arranged between said agitator arms and said feed wheel with an opening therein at its lower edge, depending swinging elements carried by said agitator arms and designed to pass over said false bottom to prevent clogging of the opening therein, and means for connecting said shaft with said ground wheels for operating the former.

In testimony whereof I have hereunto set my hand in presence of two subscribing witnesses.

JOSEPH W. LITTLE.

Witnesses:
 A. H. Fox,
 R. B. Deanes.